Patented Dec. 2, 1947

2,431,708

UNITED STATES PATENT OFFICE 2,431,708

PRINTING COMPOSITIONS FOR TEXTILES COMPRISING ESTER SALTS OF LEUCO VAT DYESTUFFS AND BETAINES OR SULFO-BETAINES WHICH CONTAIN AN ARALKYL RADICAL

Roger Ratti, Neu-Allschwil, near Basel, and Philipp Brandt, Basel, Switzerland, assignors to Durand & Huguenin S. A., Basel, Switzerland, a Swiss firm No Drawing. Application November 29, 1943, Serial No. 512,244. In Switzerland April 2, 1941

5 Claims. (Cl. 8—70)

This application is a continuation-in-part of our copending application, Ser. No. 436,530, filed on March 27, 1942.

This invention relates to the preparation of dyestuff composition for printing textile fibres, containing ester salts of leuco vat dyestuffs and assistants having a dispersing action on the ester salts, and more particularly to dyestuff compositions for printing textile fibres containing difficultly soluble ester salts of leuco vat dyestuffs and assistants having a dispersing action on the ester salts.

Still more particularly it relates to dyestuff compositions containing as assistants having a dispersing action on the ester salts, water-soluble primary to quaternary nitrogenous organic bases which contain at least one solubilising group selected from the class consisting of COOH and SO₃H, one acidic group of the molecule forming a stable internal salt with a basic group.

Still more particularly it relates to dyestuff compositions containing as assistants having a dispersing action on the ester salts, a stable internal salt of an amino acid selected from the class consisting of betaines and sulfobetaines.

Further still more particularly it relates to printing compositions especially adapted for the application of difficultly soluble ester salts of leuco vat dyestuffs and to a process for printing textile fibres with these printing compositions.

The ester salts of leuco vat dyestuffs used in the present invention may be derived from the various series of known vat dyestuffs (such as for instance from indigoids, thioindigoids and all vat dyestuffs containing the anthraquinone nucleus system and others). Compositions of great value are obtained when using salts of acid sulfuric acid esters of leuco vat dyestuffs, especially alkali salts, which may be obtained in a stable form by known methods.

The printing of textile material with ester salts of leuco vat dyestuffs known in the trade as "Indigosols," "Algosols," "Soledones" and so on is a well known art. It generally comprises dissolving the ester salts in water and a thickening agent, applying the printing paste to the fabrics by known methods and fixing the insoluble vat dyestuff on the fibre by subsequent hydrolysis and oxidation, for which the hydrolysing and oxidising agents may be added to the printing pastes.

It is the sulfuric acid ester group —SO₃H which, in general, confers the solubility in water on the ester salts of leuco vat dyestuffs. It appears, however, that this solubility varies widely according to the dyestuff being considered. Whilst some of the leucoester salts are very easily soluble in water, other ones are considerably less soluble and easily salted out by electrolytes, for instance by the sodium and ammonium salts used as oxidation agents or as acid yielding agents. For this reason, in numerous cases it is necessary to add to the printing colours containing difficultly soluble ester salts of leuco vat dyestuffs or ester salts which are easily salted out, some quantities of organic solvents, such as for instance, thiodiglycol, ethyleneglycol, sodium salt of benzyl sulfanilic acid and the like. However, certain vat dyestuffs yield ester salts which are so difficultly soluble in water that it is practically impossible to use the same for printing purposes, even with the assistance of usual solvents. In spite of the excellent properties which could be specific to such difficultly soluble ester salts, they are not put on the market. Of course, many attempts have been made to remedy this inconvenience, but a solution giving full satisfaction in every respect has not yet been found.

It is now an object of this invention to produce new dyestuff compositions and/or printing pastes particularly adapted for the printing of ester salts of leuco vat dyestuffs, especially of difficultly soluble ester salts. Moreover, a further object of this invention consists in producing printing compositions containing the ester salts, especially the difficultly soluble ester salts, in an optimal degree of dispersion for printing. It is still a further object to produce printing compositions containing the leuco ester salts precipitated in a finely divided form. It is still a further object to provide printing compositions containing the leuco ester salts dissolved in the printing paste. Moreover, a further object of this invention consists in providing printing compositions containing besides a suitable oxidising agent and if necessary besides an acid yielding agent, the leuco ester salts in a maximal degree of dispersion for printing. Finally, a still further object is to provide prints on fabrics which are distinguished by their evenness, their brilliancy of the shade and by a great dyeing power.

These and other objects of the invention are preferably accomplished by incorporating into a printing paste, water-soluble primary to quaternary nitrogenous organic bases containing at least one solubilizing group selected from the glass consisting of COOH and SO₃H, one acidic group of the molecule forming a stable internal salt with a basic group. Of course, these bases can either directly be incorporated into the printing paste or they may first be mixed with the ester salt of a leuco vat dyestuff.

The expression "stable internal salt" signifies that the internal salt is not hydrolysed in aqueous solution.

The stable salts of the above general definition may contain aliphatic, aromatic, hydroaromatic and mixed aliphatic-aromatic radicals. Any one of these radicals may be composed of different radicals which are linked not only by a direct carbon-carbon linkage, but also by bridges such as for instance O, S, NH, NH—CO, NH—SO₂ and the like. Furthermore, each of these radicals may contain further substituents.

The nitrogen atom of the organic base, from which the internal salts are derived, may also be a member of a heterocyclic nucleus, which, besides this hetero atom, may contain other hetero atoms.

The internal salts may also be derived from di- and polyamines, in which case such polyamines may contain nitrogen atoms of a different degree of alkylation or arylation. It is not necessary that every basic group of a molecule form an internal salt with an acidic group. Moreover, one molecule may contain more acidic groups than basic groups. In the latter case the acidic groups, which are not neutralised by the internal salt formation, must be neutralised by a suitable inorganic or organic base. But it is essential that, at all events, at least one basic group should form in the molecule a stable internal salt with an acidic group.

Moreover, if the organic base contains a sulfo group, this latter may also be present in form of an —O—SO₃H group.

Typical and most suitable compounds of the above general definition are the betaines and the sulfobetaines. Betaines are the internal salts of ammonium carboxylic acids whilst sulfobetaines are the corresponding internal salts of ammonium sulfonic acids. These compounds may be obtained according to the following known methods:

(a) A tertiary amine containing a carboxylic or a sulfo group is converted, preferably in form of a salt, into the corresponding ammonium compound by treating the same with a suitable alkylating agent, such as for example with methyl chloride or benzyl chloride.

(b) A tertiary amine containing no acidic group is converted into the corresponding ammonium compound by treating the same with an alkylating agent containing a carboxylic or a sulfo group, such as for example with monochloroacetic acid, benzyl chloride carboxylic acid, chloroethane sulfonic acid, chloroxy propane sulfonic acid, benzyl chloride sulfonic acid and the like.

(c) A carboxylic or a sulfo group is introduced in a suitable manner into an appropriate quaternary ammonium compound. When using for the introduction of the sulfo group one of the usually employed methods of sulfonation, one or more sulfo groups may be introduced into the ammonium compound, according to the used method of sulfonation and to the activity of the ammonium compound to be sulfonated.

Especially suitable for the purposes of the present invention are the quaternary ammonium compounds which contain only acidic groups forming an internal salt. Such compounds are for example the following ones: tetraalkyl-ammonium-betaines and -sulfobetaines, trialkyl-aralkyl-ammonium-betaines and -sulfobetaines, dialkyl-diaralkyl-ammonium-betaines and -sulfobetaines, betaines and sulfobetaines which are derived from tetraalkyl-alkylene-diamines or from N-dialkyl-N'-acyl-alkylene-diamines, hydroxyalkyl-aralkyl-ammonium-betaines and -sulfobetaines, trialkyl-aryl-ammonium-betaines and -sulfobetaines, dialkyl-aryl-aralkyl-ammonium-betaines and -sulfobetaines as well as betaines and sulfobetaines derived from heterocyclic ammonium compounds. Also primary to tertiary amino acids may form stable internal salts. For the purposes of the present invention the internal salts of the following amino acids are, for example, suitable: amino-alkyl-sulfonic acids, such as taurine and its derivatives, amino-alkyl-sulfuric acids, such as β-aminoethyl-sulfuric acid, the mono-sulfonic acids derived from dialkyl-aralkyl-amines and alkyl-diaralkyl-amines.

Excellent results are especially obtained with internal salts containing at least one aralkyl radical, such as for example the benzyl- and naphthomethyl radical.

The internal salts of above mentioned amino and ammonium acids are soluble in water. Their aqueous solutions show a neutral reaction. They have an excellent dissolving action on ester salts, especially on difficultly soluble alkali salts of acid sulfuric acid esters of leuco vat dyestuffs. This fact may perhaps be explainable by the formation of a salt-like or addition compound between the leuco ester salt and the internal salt of the amino acid, but this explanation is only to be considered as hypothetical. In some cases indeed the solubility of a mixture of an alkali ester salt with an internal salt of an amino acid in water is considerably increased in comparison with the solubility of each component of the mixture.

By adding to solutions of ester salts the usually required assistants for the development (oxidising agents and acid yielding agents), which assistants are generally electrolytes, the ester salts are mostly precipitated from their solutions especially when using difficultly soluble ester salts. In presence of the above-mentioned internal salts a precipitation of the ester salts can entirely be avoided or the precipitation can be regulated in such a manner that the ester salts are dispersed in the printing paste in form of very finely divided particles. By suitable selection of the internal salts and by a proper dosage of the amount to be added to the dyestuff compositions, the degree of dispersion of the various leuco ester salts can be adjusted in such a way that for one ester salt and for the selected application and/or developing method there may be obtained the best degree of dispersion giving in printing on textile fibres the best yield in dyeing power, evenness and brilliancy.

According to the present invention, the new dyestuff compositions can quite generally be prepared by mixing ester salts of leuco vat dyestuffs with internal salts of amino acids of the above defined types. As many of the claimed internal salts are solid non-hygroscopic bodies, it is possible to put dry dyestuff compositions on the market, which already contain the necessary assistants. It is evident that the novel assistants can also be added, when the printing paste is prepared.

It must be understood that also mixtures of different internal salts of the above described types or mixtures of internal salts with assistants claimed in U. S. Patent No. 2,302,753 and in our copending application Ser. No. 436,530 can be used.

The new dyestuff preparations represent a valuable improvement in printing with ester salts of leuco vat dyestuffs. Especially the difficultly soluble, hitherto not or difficultly applicable alkali ester salts of certain leuco vat dyestuffs, such as the sodium salts of the said sulfuric acid ester of leuco-2:1-6:5-anthraquinone-diphenylthiazol, leuco-dibromo-anthanthrone, leuco-2:1-naphth-thioindigo, leuco-pyranthrone, leuco-dichloroiso-dibenzanthrone, leuco-dibenzpyrene-quinone, may now in form of the new compositions advantageously be used for printing purposes.

We are aware, that in U. S. Patent No. 2,069,351 it has already been proposed to use salts of dibenzylsulfanilic acid as assistants for the application of sulfuric ester salts of leuco vat dyestuffs to textiles. It has also been proposed to use the sodium salt of monobenzylsulfanilic acid (solution salt B) as assistant for the same purpose. However the mono- and the di-benzyl-sulfanilic acid are distinguished from the assistants claimed in the present patent, by the fact that the former cannot form a stable internal salt. When using as assistants for the printing of difficultly soluble leuco ester salts the compounds of the present invention, containing stable internal salt-forming groups, incomparably better results are obtained than when using the salts of the mono- and dibenzylsulfanilic acid.

We are further aware, that betaines and sulfobetaines have been proposed in U. S. Patents 1,989,784, 2,081,017 and 2,146,646 as assistants for printing unreduced vat dyestuffs and their free leuco compounds. It is a known fact that great differences exist between a vat solution of a vat dyestuff and a solution of an ester salt of a leuco vat dyestuff. It was therefore impossible to predict that, if an assistant is appropriate for vat dyestuffs and vat solutions, it will also be suitable for ester salts of leuco vat dyestuffs. Moreover, in German Patent 708,256 betaines and sulfobetaines are proposed as assistants in resist printing pastes under paddings with an ester salt of a leuco vat dyestuff. It could therefore not be foreseen that betaines and sulfobetaines could be so successfully employed as assistants for ester salts of leuco vat dyestuffs.

The present invention will be further described in connection with the following specific examples, in which the parts are by weight and which are given in order to illustrate this invention. The present invention is not limited to these examples. Changes may be made in the selection of the leuco ester-salts and of the internal salts of amino acids and in their proportions, manipulation steps and other conditions, without departing from the scope of the appended claims.

*Example 1*

40 parts of the sodium salt of the acid sulfuric acid ester of leuco-2:1-6:5-anthraquinone-diphenyl-thiazol, containing 50 per cent of vat dyestuff, are mixed with 70 parts of one of the following bodies:

(a) The sulfobetaine of trimethyl-benzyl-ammonium sulfonic acid or (b) The sulfobetaine of triethyl-benzyl-ammonium sulfonic acid or (c) The sulfobetaine of dimethyl-benzyl-phenyl-ammonium sulfonic acid.

The dyestuff preparations thus obtained are specially appropriate for the preparation of printing pastes for printing according to the nitrite-developing process. Thus a good printing paste can be obtained for instance with the following formula:

| | Parts |
|---|---|
| One of the above mentioned preparations | 110 |
| Water | 330 |
| Neutral starch tragacanth thickening | 500 |
| 30% sodium nitrite solution | 40 |
| 10% sodium carbonate solution | 20 |
| | 1000 |

The dyestuff preparations are dissolved in the indicated quantities of hot water and thickening. After having cooled down the paste, the nitrite and carbonate solutions are then added while stirring. The printing pastes thus obtained contain the enolic ester compound precipitated in form of a very fine dispersion. If one of these printing pastes is printed for instance on cotton and if the prints are subsequently dried and developed at 70° C. for 8 seconds in a bath containing 20 cc. of 96% sulfuric acid per liter of water, then rinsed, neutralised and soaped at the boil, very bright, even and strong greenish yellow prints are obtained.

Still deeper shades will be obtained by steaming the printed samples for 4 minutes before developing.

The above mentioned sulfobetaines a, b and c may be obtained as follows:

(a) By sulfonation of trimethylbenzylammoniumsulfate with fuming sulfuric acid containing 33% SO₃ in a manner analogous to example 1 of German Patent 233,328.

(b) By sulfonation of triethylbenzylammoniumsulfate as described above in (a).

(c) By sulfonation of dimethylphenylbenzyl-ammoniumchloride as described in Example 1 of German Patent 233,328. The sulfobetaine contains the sulfo group in the benzyl radical.

*Example 2*

40 parts of the sodium salt of the acid sulfuric acid ester salt of leuco-2:1-6:5-anthraquinone diphenylthiazol corresponding to 50% of vat dyestuff are mixed with 100 parts of any one of the following substances:

(a) N-benzyl-pyridinium sulfobetaine, (b) The sulfobetaine of the N-benzylpyridinium-3-sulfonic acid, (c) The sulfobetaine of the N-methyl-pyridinium-3-sulfonic acid, (d) The sulfobetaine of the dimethyl-benzyl-phenyl-ammonium-sulfonic acid.

(e) The monodiethylamine salt of the sulfobetaine of the dimethyl-benzyl-phenyl-ammonium-disulfonic acid.

The dyestuff preparations thus obtained are perfectly suitable for the preparation of printing pastes according to any one of the known steaming processes, for instance, according to the following formula:

| | Parts |
|---|---|
| One of the dyestuff preparations cited above | 140 |
| Water | 260 |
| Neutral starch tragacanth thickening | 500 |
| 25% sodium chlorate solution | 50 |
| 50% ammonium sulfocyanide solution | 40 |
| 1% ammonium vanadate solution | 10 |
| | 1000 |

The dyestuff preparations are dissolved by heating and stirring in the indicated quantities of hot water and thickening. The solution thus obtained is then cooled down and the other above mentioned solutions are added thereto.

The printing pastes contain the enolic ester compound precipitated in a very fine divided form.

If one of these printing pastes is printed on cotton or on viscose rayon and if the printed samples are dried and steamed for 8 minutes or 2×8 minutes, then rinsed, soaped at the boil, rinsed and dried, very bright, full bodied and even greenish yellow prints are obtained.

The above mentioned sulfobetaines a to e may be obtained as follows:

(a) By sulfonation of N-benzylpyridiniumsulfate with fuming sulfuric acid containing 68% SO₃ at 90° C. in a manner analogous to that cited in Example 1 of German Patent 233,328. The sulfobetaine, being very easily soluble in water, must be isolated by evaporating the solution to dryness. The sulfobetaine contains the sulfo group in the benzyl radical.

(b) 300 g. of the potassium salt of the pyridine-3-sulfonic acid dissolved in 300 cc. of water and 195 g. of benzyl chloride are vigorously stirred at 60° C. for 18 hours and the solution evaporated to dryness. For purification the sulfobetaine may be recrystallised from alcohol containing 5% of water.

(c) By treating an aqueous solution of equal parts of the potassium salt of pyridine-3-sulfonic acid and water with methyl chloride in an autoclave at 90° C. until no more methyl chloride is absorbed.

The sulfobetaine crystallises from the solution on cooling and standing and may be purified by recrystallisation from water.

(d) See Example 1c.

(e) By sulfonation of dimethylphenylbenzylammonium chloride as described in the second paragraph of Example 1 of German Patent 233,328. The free acid, which can be obtained from the calcium salt, contains only one free sulfo group, the other forming an internal salt. By neutralisation with diethylamine the monodiethylamine salt is obtained. This acid contains one sulfo group in the benzyl radical and the other sulfo-group in the phenyl radical.

Example 3

40 parts of the sodium salt of the acid sulfuric acid ester of leuco dibromoanthanthrone corresponding to 50% vat dyestuff are mixed with 70 parts of one of the following substances:

(a) Pyridine-betaine
(b) N-benzyl-pyridinium sulfobetaine.

The dyestuff preparations thus obtained are particularly suitable for the preparation of printing pastes according to the nitrite-developing process. Very good printing results can for instance be obtained with the following formula:

| | Parts |
|---|---|
| One of the above cited dyestuff preparations | 110 |
| Water | 350 |
| Neutral starch tragacanth thickening | 500 |
| A 30% sodium nitrite solution | 30 |
| A 22% ammonia solution | 10 |
| | 1000 |

The printing pastes are made up as indicated in Example 1. The dyestuff is perfectly dissolved and remains in solution in the printing colour. After printing on cotton or viscose rayon, drying and oxidising in the manner indicated in Example 1, very bright, deep orange prints are obtained.

The above mentioned betaine and sulfobetaine a and b may be obtained as follows:

(a) By addition of monochloroacetic acid to dry pyridine according to von Gerichten, Berichte 15, page 1251. The chlorohydrate may be transformed into the free betaine by treating the same with concentrated sulfuric acid, evaporating the hydrochloric acid and eliminating the SO₄-ions by means of barium carbonate.

(b) See Example 2a.

Example 4

40 parts of the sodium salt of the acid sulfuric acid ester salt of leuco-dibromoanthanthrone corresponding to 50% of vat dyestuff are mixed with 100 parts of N-benzyl-pyridinium sulfobetaine. With the dyestuff preparation thus obtained printing colours can be prepared according to any one of the steaming processes by using for instance the following formula:

| | Parts |
|---|---|
| The aforesaid dyestuff preparation | 140 |
| Water | 270 |
| Neutral starch tragacanth thickening | 500 |
| A 50% ammonium sulfocyanide solution | 20 |
| A 25% sodium chlorate solution | 40 |
| A 1% ammonium vanadate solution | 20 |
| A 22% ammonia solution | 10 |
| | 1000 |

The printing paste obtained contains the ester salt in a well dissolved form. By printing on cotton or viscose rayon and steaming for 8 minutes a strong, bright orange shade is obtained.

The above mentioned sulfobetaine may be prepared as indicated in Example 2a.

Example 5

40 parts of the acid sulfuric acid ester salt of leuco-2:1-naphthioindigo corresponding to 50% of vat dyestuff are mixed with 50 parts of any one of the following substances:

(a) The sulfobetaine of dimethyl-benzyl-phenyl-ammonium sulfonic acid.
(b) The sulfobetaine of trimethyl-phenyl-ammonium-p-sulfonic acid.
(c) Pyridine-betaine.
(d) The sulfobetaine of N-methyl-pyridinium-3-sulfonic acid.
(e) The sulfobetaine of N-benzyl-pyridinium-3-sulfonic acid.
(f) The sulfobetaine of N-benzyl-pyridinium-sulfonic acid, containing the sulfo group in the benzyl nucleus. With the dyestuff preparations thus obtained printing pastes are prepared according to any one of the steaming processes. The following formula can, for instance, be used:

| | Parts |
|---|---|
| One of the above cited dyestuff preparations | 90 |
| Water | 320 |
| Neutral starch tragacanth thickening | 500 |
| A 50% ammonium sulfocyanide solution | 30 |
| A 25% sodium chlorate solution | 40 |
| A 1% ammonium vanadate solution | 10 |
| A 22% ammonia solution | 10 |
| | 1000 |

The printing pastes made up as described in Example 2, contain the ester salt precipitated in a very fine dispersed form. If a textile fibre, for instance cotton or viscose rayon, is printed with one of these printing colours and if the printed samples are steamed for 8 minutes, very deep, bright and even brown prints are obtained.

The above mentioned sulfobetaines a—f may be obtained as follows:

(a) See 1c
(b) Griess, Berichte 12, page 2116 and Kuhn, Berichte 70, page 1340.
(c) See 3a
(d) See 2c
(e) See 2b
(f) See 2a.

Example 6

40 parts of the acid sulfuric acid ester salt of leuco-2:1-naphththioindigo corresponding to 50% of vat dyestuff are mixed with 70 parts of the sulfobetaine of the trimethyl-phenyl-ammonium-m-sulfonic acid. The preparation thus obtained can advantageously be used for the preparation of a printing paste according to the nitrite-developing process:

|  | Parts |
|---|---|
| The above cited dyestuff preparation | 110 |
| Water | 360 |
| Neutral starch tragacanth thickening | 500 |
| A 30% sodium nitrite solution | 30 |
|  | 1000 |

The ester salt is precipitated in the printing colour in a very fine dispersed form. When this printing paste is printed, for instance, on cotton or viscose rayon and when the printed samples are dried, steamed for 4 minutes and developed as indicated in Example 1, a very deep, well penetrated and even brown print will be obtained.

The above mentioned sulfobetaine may be obtained according to Giovanni Devoto: Gazetta Chimica Italiana 64, page 371 (1934).

Example 7

40 parts of the sodium salt of the acid sulfuric acid ester of leuco-2:1-6:5-anthraquinone-diphenylthiazol corresponding to 50 per cent of vat dyestuff are mixed with 50 parts of the internal salt of diethyl-benzyl-amine-sulfonic acid.

The dyestuff preparation thus obtained may be used for the preparation of a printing paste according to the nitrite-developing process. For this purpose the following printing paste may be used:

|  | Parts |
|---|---|
| The above mentioned preparation | 100 |
| Water | 340 |
| Neutral starch tragacanth thickening | 500 |
| A 30% sodium nitrite solution | 40 |
| A 10% sodium carbonate solution | 20 |
|  | 1000 |

The printing paste thus obtained contains the ester salt in a finely divided form. By printing on cotton or viscose rayon, drying, ageing for 4 minutes and developing as indicated in Example 1, very deep, bright, even and well penetrated yellow prints are obtained.

The above mentioned internal salt may be obtained by sulfonation of diethylbenzylamine with fuming sulfuric acid containing 33% $SO_3$ at 90° C. during 10 hours and elimination of the excess of sulfuric acid by barium carbonate.

Example 8

40 parts of the sodium salt of the acid sulfuric acid ester of leuco-2:1-6:5-anthraquinone-diphenylthiazol corresponding to 50 per cent of the vat dyestuff are mixed with 50 parts of the sulfobetaine of the dimethyl-benzyl-phenylammonium-p-sulfonic acid, the sulfo group being in the phenyl nucleus.

The dyestuff preparation thus obtained is especially suitable for the preparation of printing pastes according to the nitrite-developing process. A good printing paste can be obtained for instance with the following formula:

|  | Parts |
|---|---|
| The above mentioned preparation | 100 |
| Hot water | 340 |
| Neutral starch tragacanth thickening | 500 |
| A 30% sodium nitrite solution | 40 |
| A 10% sodium carbonate solution | 20 |
|  | 1000 |

The dyestuff preparation is dissolved as well as possible in the indicated quantities of hot water and thickening, then the solutions of the nitrite and carbonate are added. The printing paste, containing the enolic ester compound in finely divided form, is printed, dried, steamed for 4 minutes and the printed samples are developed and finished according to the indications given in Example 1.

A very bright, deep, even and well penetrated yellow print will be obtained.

If in this example the sulfobetaine of dimethyl-benzyl-phenyl-ammonium-p-sulfonic acid is replaced by the same quantities of the sodium salt of dibenzyl-sulfanilic acid (see U. S. Patent 2,029,351) or by the same quantities of the sodium salt of benzyl-sulfanilic acid, the prints obtained, according to the above cited formula, will be much weaker, less even and badly penetrated. The difference in yield is at least 50%.

The above mentioned sulfobetaine may be obtained as follows: a solution of 450 parts of the sodium salt of dimethylaniline-p-sulfonic acid in 450 parts of water is vigorously stirred with 250 parts of benzyl chloride at 60°–65° C. for 4 hours. On cooling the sulfobetaine crystallises from the solution.

What we claim is:

1. A dyestuff composition for printing textile fibers comprising an ester salt of a leuco vat dyestuff and a water-soluble, stable internal salt of a tertiary to quaternary amino acid selected from the class consisting of betaines which contain an aralkyl radical and sulfobetaines which contain an aralkyl radical.

2. A dyestuff composition for printing textile fibers comprising an ester salt of a leuco vat dyestuff and a water-soluble, stable internal salt of a quaternary amino acid selected from the class consisting of betaines which contain a benzyl radical and sulfobetaines which contain a benzyl radical.

3. A dyestuff composition for printing textile fibers comprising an ester salt of a leuco vat dyestuff and the sulfobetaine of dimethyl-phenyl-benzyl-ammonium-monosulfonic acid, containing the sulfo group in the benzyl radical.

4. A dyestuff composition for printing textile fibers comprising an ester salt of a leuco vat dyestuff and the sulfobetaine of N-benzylpyridinium-3-sulfonic acid.

5. A dyestuff composition for printing textile fibers comprising an ester salt of a leuco vat dyestuff and the internal salt of N-diethyl-benzyl-amine-sulfonic acid.

ROGER RATTI.
PHILIPP BRANDT.

(References on following page)

REFERENCES CITED

The following references are of record in the file of this patent:

UNITED STATES PATENTS

| Number | Name | Date |
|---|---|---|
| 2,029,351 | Wormald | Feb. 4, 1936 |
| 2,081,017 | Nusslein | May 18, 1937 |
| 2,146,646 | Nusslein | Feb. 7, 1939 |
| 2,123,740 | Murphy | July 12, 1938 |
| 2,217,846 | Orthner et al. | Oct. 15, 1940 |
| 2,206,249 | Daimler | July 2, 1940 |
| 2,211,126 | Kern | Aug. 13, 1940 |
| 1,989,784 | Berthold | Feb. 5, 1935 |
| 2,302,753 | Duport | Nov. 24, 1942 |
| 2,205,032 | Chambers | June 18, 1940 |

FOREIGN PATENTS

| Number | Country | Date |
|---|---|---|
| 479,847 | Great Britain | Feb. 10, 1938 |